(12) United States Patent
Effern (10) Patent No.: US 7,774,318 B2
(45) Date of Patent: Aug. 10, 2010

(54) METHOD AND SYSTEM FOR FAST DELETION OF DATABASE INFORMATION

(75) Inventor: Arndt Effern, Sinsheim-Duehren (DE)

(73) Assignee: SAP AG, Walldorf (DE)

( * ) Notice: Subject to any disclaimer, the term of this patent is extended or adjusted under 35 U.S.C. 154(b) by 459 days.

(21) Appl. No.: 11/830,494

(22) Filed: Jul. 30, 2007

(65) Prior Publication Data

US 2009/0037439 A1    Feb. 5, 2009

(51) Int. Cl.
    *G06F 7/00*    (2006.01)
(52) U.S. Cl. ........................ 707/662; 707/754
(58) Field of Classification Search ............ 707/1, 707/2, 3, 4, 999.001, 999.002, 999.206, 754, 707/662
    See application file for complete search history.

(56) References Cited

U.S. PATENT DOCUMENTS

| | | | |
|---|---|---|---|
| 6,111,574 A * | 8/2000 | Meek ........................ | 715/835 |
| 6,965,891 B1 | 11/2005 | Jakobsson et al. | |
| 7,631,014 B2 * | 12/2009 | Bhattacharjee et al. ... | 707/104.1 |
| 2005/0038784 A1 | 2/2005 | Zait et al. | |

FOREIGN PATENT DOCUMENTS

WO    01/93105 A2    12/2001

OTHER PUBLICATIONS

Greenstein, Marina et al., "Using DB2 routines to ease migration", http://www-128.ibm.com/developerworks/db2/library/techarticle/dm-0402greenstein/index.html, (Feb. 4, 2004).
McInerney, Paul "DB2 partitioning features", http://www-128.ibm.com/developerworks/db2/library/techarticle/dm-0608mcinerney/, (Aug. 3, 2006).
"General Management of Schema Objects", Oracle Database Administrator's Guide, 10g Release 1 (10.1), Part No. B10739-01, Ch. 20, http://download-uk.oracle.com/docs/cd/B14117_01/server.101/b10739/general.htm, (Dec. 2003).
"Performance Advantages of TRUNCATE", IBM Informix Guide to SQL: Syntax, http://publib.boulder.ibm.com/infocenter/idshelp/v10/index.jsp?topic=/com.ibm.sqls.doc/sqls851.htm, (Nov. 16, 2005).

(Continued)

*Primary Examiner*—Khanh B Pham
*Assistant Examiner*—Amy Ng
(74) *Attorney, Agent, or Firm*—Brake Hughes Bellermann LLP (57) ABSTRACT

An example method may obtain a request to delete a plurality of data items satisfying a first condition from a database, and request a retrieval of a first database item from a first predefined storage block associated with the database based on a query including a negation of the first condition. It may be determined whether the first database item is retrieved from the first predefined storage block in response to the requesting the retrieval of the first database item from the first predefined storage block. When it is determined that the first database item is not retrieved, deletion of the first predefined storage block may be requested, else deletion of each one of the plurality of data items satisfying the first condition from the first predefined storage block may be requested.

17 Claims, 9 Drawing Sheets

OTHER PUBLICATIONS

Mohanakrishnan, Vadivel "Delete VS Truncate", SQL Server Tutorials, http://www.dotnetspider.com/kb/Article2866.aspx, (Dec. 24, 2006).

Extended European Search Report for EP Patent Application No. 08011947, mailed on Dec. 16, 2008, 5 pages.

Gartner, A. et al., "Efficient Bulk Deletes in Relational Database", Proceedings of 17th International Conference on Data Engineering, Apr. 2-6, 2001, pp. 183-192.

* cited by examiner

CREATE TABLE MY_TAB (
  ITEM CHAR(10), CALMONTH CHAR(6), SUPPLIER CHAR(10), PRICE NUMBER(10) )
PARTITION BY LIST (CALMONTH) (
  PARTITION CALMONTH_01 VALUES ('012004'),
  PARTITION CALMONTH_02 VALUES ('022004'),
  PARTITION CALMONTH_03 VALUES ('032004'),
  PARTITION CALMONTH_04 VALUES ('042004'),
  PARTITION CALMONTH_05 VALUES ('052004'),
  PARTITION CALMONTH_06 VALUES ('062004') );
CREATE INDEX MY_TAB_IDX01 ON MY_TAB(ITEM);
CREATE INDEX MY_TAB_IDX02 ON MY_TAB(SUPPLIER);
```

| ITEM | CALMONTH | SUPPLIER | PRICE |
|---|---|---|---|
| | | | |
| | | | |

```
500
502  INSERT INTO MY_TAB VALUES ('HAMMER', '012004', 'SUP_01', 200);
504  INSERT INTO MY_TAB VALUES ('NAIL', '022004', 'SUP_02', 50);
506  INSERT INTO MY_TAB VALUES ('SCREW', '022004', 'SUP_02', 150);
508  INSERT INTO MY_TAB VALUES ('MOTOR_OIL', '032004', 'SUP_03', 200);
510  INSERT INTO MY_TAB VALUES ('LUBE', '032004', 'SUP_03', 20);
512  INSERT INTO MY_TAB VALUES ('GRIPPER', '032004', 'SUP_01', 100);
514  INSERT INTO MY_TAB VALUES ('CLAMPS', '042004', 'SUP_02', 50);
516  INSERT INTO MY_TAB VALUES ('BENZINE', '052004', 'SUP_03', 200);
518  INSERT INTO MY_TAB VALUES ('WIRE', '052004', 'SUP_02', 250);
520  INSERT INTO MY_TAB VALUES ('CHISEL', '052004', 'SUP_01', 50);
522  INSERT INTO MY_TAB VALUES ('NAIL', '062004', 'SUP_02', 100);
524  INSERT INTO MY_TAB VALUES ('SCREW', '062004', 'SUP_02', 150);
```

| | ITEM (402) | CALMONTH (404) | SUPPLIER (406) | PRICE (408) |
|---|---|---|---|---|
| 602 | HAMMER | 012004 | SUP_01 | 200 |
| 606 | SCREW | 022004 | SUP_02 | 150 |
| 604 | NAIL | 022004 | SUP_02 | 50 |
| 612 | GRIPPER | 032004 | SUP_01 | 100 |
| 608 | MOTOR_OIL | 032004 | SUP_03 | 200 |
| 610 | LUBE | 032004 | SUP_03 | 20 |
| 614 | CLAMPS | 042004 | SUP_02 | 50 |
| 620 | CHISEL | 052004 | SUP_01 | 50 |
| 618 | WIRE | 052004 | SUP_02 | 250 |
| 616 | BENZINE | 052004 | SUP_03 | 200 |
| 624 | SCREW | 062004 | SUP_02 | 150 |
| 622 | NAIL | 062004 | SUP_02 | 100 |

702 CALMONTH_01

| ITEM | CALMONTH | SUPPLIER | PRICE |
|---|---|---|---|
| HAMMER | 012004 | SUP_01 | 200 |

704 CALMONTH_02

| ITEM | CALMONTH | SUPPLIER | PRICE |
|---|---|---|---|
| SCREW | 022004 | SUP_02 | 150 |
| NAIL | 022004 | SUP_02 | 50 |

706 CALMONTH_03

| ITEM | CALMONTH | SUPPLIER | PRICE |
|---|---|---|---|
| GRIPPER | 032004 | SUP_01 | 100 |
| MOTOR_OIL | 032004 | SUP_03 | 200 |
| LUBE | 032004 | SUP_03 | 20 |

708 CALMONTH_04

| ITEM | CALMONTH | SUPPLIER | PRICE |
|---|---|---|---|
| CLAMPS | 042004 | SUP_02 | 50 |

710 CALMONTH_05

| ITEM | CALMONTH | SUPPLIER | PRICE |
|---|---|---|---|
| CHISEL | 052004 | SUP_01 | 50 |
| WIRE | 052004 | SUP_02 | 250 |
| BENZINE | 052004 | SUP_03 | 200 |

712 CALMONTH_06

| ITEM | CALMONTH | SUPPLIER | PRICE |
|---|---|---|---|
| SCREW | 062004 | SUP_02 | 150 |
| NAIL | 062004 | SUP_02 | 100 |

METHOD AND SYSTEM FOR FAST DELETION OF DATABASE INFORMATION

TECHNICAL FIELD

This description relates to techniques for fast deletion of database information.

BACKGROUND

Many enterprise applications may be based on a relational data model wherein data records may be stored in tables of relational databases. Thus, database tables may be indexed to provide fast access to single data records.

As databases may grow over time, administrators may desire removal of old or unused data. However, deleting large amounts of data may require very resource-intensive operations on relational databases that may require a significant amount of processing time. Therefore, database vendors may provide methods for fast deletion of mass data if a whole table, table partition, table fragment, or table block may be deleted.

Using table partitioning, database tables may be split into distinct sets of data records based on fixed values or ranges of values. Each table partition may then be treated as an object that may be easily created, dropped, or truncated (e.g., by dropping and recreating the object) including referencing indexes. However, before a table or table partition or data block may be dropped or truncated to accelerate mass data deletion, an application may need to ensure that a delete condition is satisfied by all data records included in a table or table partition or data block.

Thus, it may be desirable to provide fast techniques for determining whether a drop or truncate table or table partition may be performed.

SUMMARY

According to one general aspect, a system includes a database storage area including a plurality of predefined storage blocks configured to store database items associated with a database. The system further includes a data deletion manager including a deletion request receiver configured to obtain a request to delete a plurality of data items satisfying a first condition from the database, a retrieval request processor configured to request a retrieval of a first database item from a first predefined storage block associated with the database based on a query including a negation of the first condition, and a retrieval analyzer configured to determine whether the first database item is retrieved from the first predefined storage block in response to the retrieval request processor requesting the retrieval of the first database item from the first predefined storage block. The data deletion manager further includes a block deletion processor configured to request deletion of the first predefined storage block based on the retrieval analyzer determining that the first database item is not retrieved, and a data item deletion processor configured to request deletion of each one of the plurality of data items satisfying the first condition from the first predefined storage block based on the retrieval analyzer determining that the first database item is retrieved.

According to yet another aspect, a method includes obtaining a request to delete a plurality of data items satisfying a first condition from a database, and requesting a retrieval of a first database item from a first predefined storage block associated with the database based on a query including a negation of the first condition. The method further includes determining whether the first database item is retrieved from the first predefined storage block in response to the requesting the retrieval of the first database item from the first predefined storage block. When it is determined based on the determining that the first database item is not retrieved, requesting deletion of the first predefined storage block may be requested. When it is determined based on the determining that the first database item is retrieved, deletion of each one of the plurality of data items satisfying the first condition from the first predefined storage block may be requested.

According to yet another aspect, a computer program product is tangibly embodied on a computer-readable medium and is configured to cause a data processing apparatus to obtain a request to delete a plurality of data items satisfying a first condition from a database, and request a retrieval of a first database item from a first predefined storage block associated with the database based on a query including a negation of the first condition. The computer program product is further configured to cause the data processing apparatus to determine whether the first database item is retrieved from the first predefined storage block in response to the requesting the retrieval of the first database item from the first predefined storage block. When it is determined based on the determining that the first database item is not retrieved, the computer program product is configured to cause the data processing apparatus to request deletion of the first predefined storage block. When it is determined based on the determining that the first database item is retrieved, the computer program product is configured to cause the data processing apparatus to request deletion of each one of the plurality of data items satisfying the first condition from the first predefined storage block.

The details of one or more implementations are set forth in the accompanying drawings and the description below. Other features will be apparent from the description and drawings, and from the claims.

DETAILED DESCRIPTION

Figure 1:
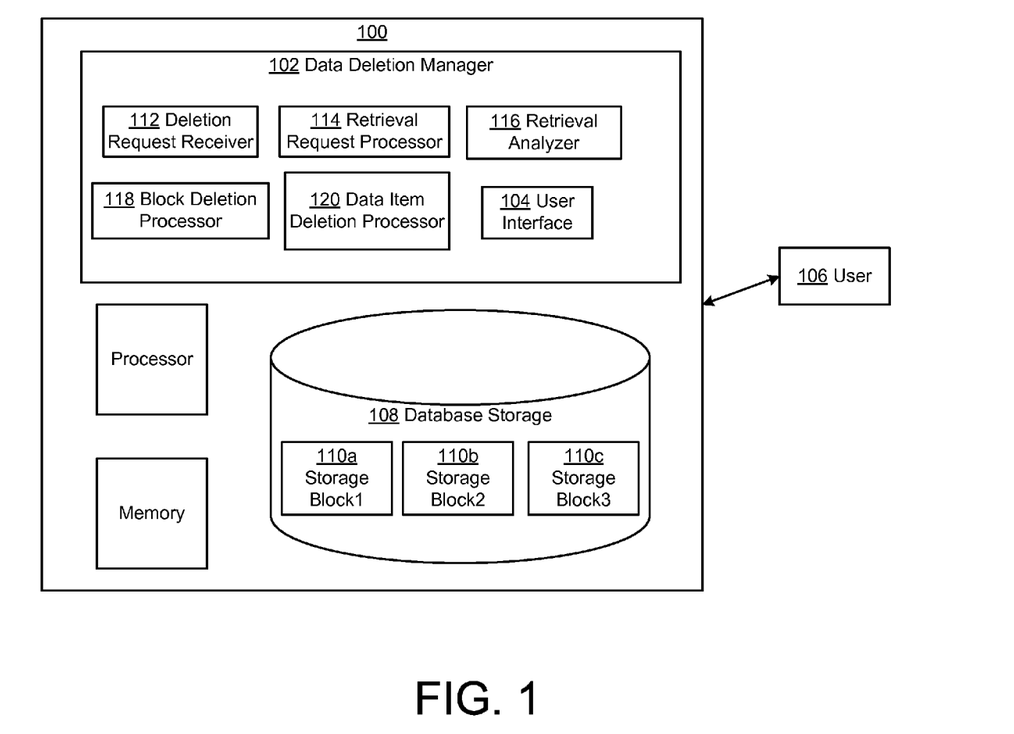
FIG. 1 is a block diagram of an example system for deletion of database information.

FIG. 1 is a block diagram of a system 100 for deletion of database information. In the example of FIG. 1, a data deletion manager 102 includes various processing engines that may be configured to manage database information. According to an example embodiment, the data deletion manager 102 may include a user interface 104 configured to manage communication with a user 106.

According to an example embodiment, the system 100 may include a database storage area 108 for storing database information. The database storage area 108 may include storage blocks 101a, 110b, 110c configured to store relational database data items associated with a database. For example, the storage blocks 110a, 110b, 110c may include predefined storage blocks and may be configured to store data records associated with a relational database. For example, the data records may be associated with database tables. For example, the storage blocks 110a, 110b, 110c may be configured based on an indexing technique. For example, the indexing technique may include a B-tree indexing technique. According to an example embodiment, the storage blocks 110a, 110b, 110c may be configured based on a whole database table, a table partition, a table fragment, or a table block.

According to an example embodiment, the data deletion manager 102 may include a deletion request receiver 112 configured to obtain a request to delete a plurality of data items satisfying a first condition from the database. For example, the request may include a request to delete all records associated with a particular vendor, if the vendor has gone out of business.

According to an example embodiment, the data deletion manager 102 may include a retrieval request processor 114 configured to request a retrieval of a first database item from a first predefined storage block associated with the database based on a query including a negation of the first condition. For example, the negation of the first condition may include requesting retrieval of records that are not associated with the particular vendor who has gone out of business. Thus, if no records are returned, the first predefined storage block may be safely deleted. According to an example embodiment, the retrieval request processor 114 may be configured to request the retrieval of the first database item from an indexed partition associated with the database based on a query including a negation of the first condition.

According to an example embodiment, the data deletion manager 102 may include a retrieval analyzer 116 configured to determine whether the first database item is retrieved from the first predefined storage block in response to the retrieval request processor 114 requesting the retrieval of the first database item from the first predefined storage block. According to an example embodiment, the retrieval analyzer 116 may be configured to determine whether only a single database item is retrieved from the first predefined storage block in response to the retrieval request processor 114 requesting the retrieval of the first database item from the first predefined storage block. For example, if only a single database item is retrieved, then the first predefined storage block includes information other than the information to be deleted, and thus the desired information may be deleted one item at a time.

According to an example embodiment, the data deletion manager 102 may include a block deletion processor 118 configured to request deletion of the first predefined storage block based on the retrieval analyzer 116 determining that the first database item is not retrieved. According to an example embodiment, the block deletion processor 118 may be configured to request deletion of the first predefined storage block based on requesting a truncation of a database table.

According to an example embodiment, the block deletion processor 118 may be configured to request deletion of the first predefined storage block based on requesting a truncation of a database table fragment.

According to an example embodiment, the data deletion manager 102 may include a data item deletion processor 120 configured to request deletion of each one of the plurality of data items satisfying the first condition from the first predefined storage block based on the retrieval analyzer 116 determining that the first database item is retrieved.

According to an example embodiment, the predefined storage blocks 110a, 110b, 110c may include predefined database partitions configured to store database items associated with the database. According to an example embodiment, the retrieval request processor 114 may be configured to request the retrieval of the first database item from a first predefined database partition associated with the database based on a query including a negation of the first condition, and the retrieval analyzer 116 may be configured to determine whether the first database item is retrieved from the first predefined database partition in response to the retrieval request processor 114 requesting the retrieval of the first database item from the first predefined database partition. According to an example embodiment, the block deletion processor 118 may be configured to request deletion of the first predefined database partition based on the retrieval analyzer 116 determining that the first database item is not retrieved.

According to an example embodiment, the retrieval request processor 114 may be configured to request a retrieval of a second database item from a second predefined storage block 110a, 110b, 110c associated with the database based on a query including a negation of the first condition, and the retrieval analyzer 114 may be configured to determine whether the second database item is retrieved from the second predefined storage block 110a, 110b, 110c in response to the retrieval request processor 114 requesting the retrieval of the second database item from the second predefined storage block 110a, 110b, 110c. According to an example embodiment, the block deletion processor 118 may be configured to request deletion of the second predefined storage block based on the retrieval analyzer 114 determining that the second database item is not retrieved, and the data item deletion processor 120 may be configured to request deletion of each one of the data items satisfying the first condition from the second predefined storage block 110a, 110b, 110c based on the retrieval analyzer 116 determining that the second database item is retrieved.

According to an example embodiment, the database may include a relational database.

Deleting large amounts of data from a database table may require very resource-intensive operations on relational databases that may require a significant amount of processing time. Therefore, database vendors may provide methods for fast deletion of mass data if a whole table, table partition, table fragment, or table block may be deleted.

Administrators or application programmers, however, may need to ensure that certain prerequisites are fulfilled before using conventional fast deletion methods, as database servers may not check automatically. Using table partitioning, database tables may be split into distinct sets of data records based on fixed values or ranges of values. Each database table partition may then be treated as an object that may be easily created, dropped, or truncated (e.g., by dropping and recreating the object) including referencing indexes. However, before a table or table partition or data block may be dropped or truncated to accelerate mass data deletion, an application may need to ensure that a delete condition is satisfied by all data records included in a table or table partition or data block.

Thus, it may be desirable to provide fast techniques for determining whether a drop or truncate table or table partition may be performed.

According to an example embodiment, a fast deletion of data blocks may be provided based on checking data blocks such as database tables, table partitions, or table extends based on inverted deletion conditions.

Figure 2:
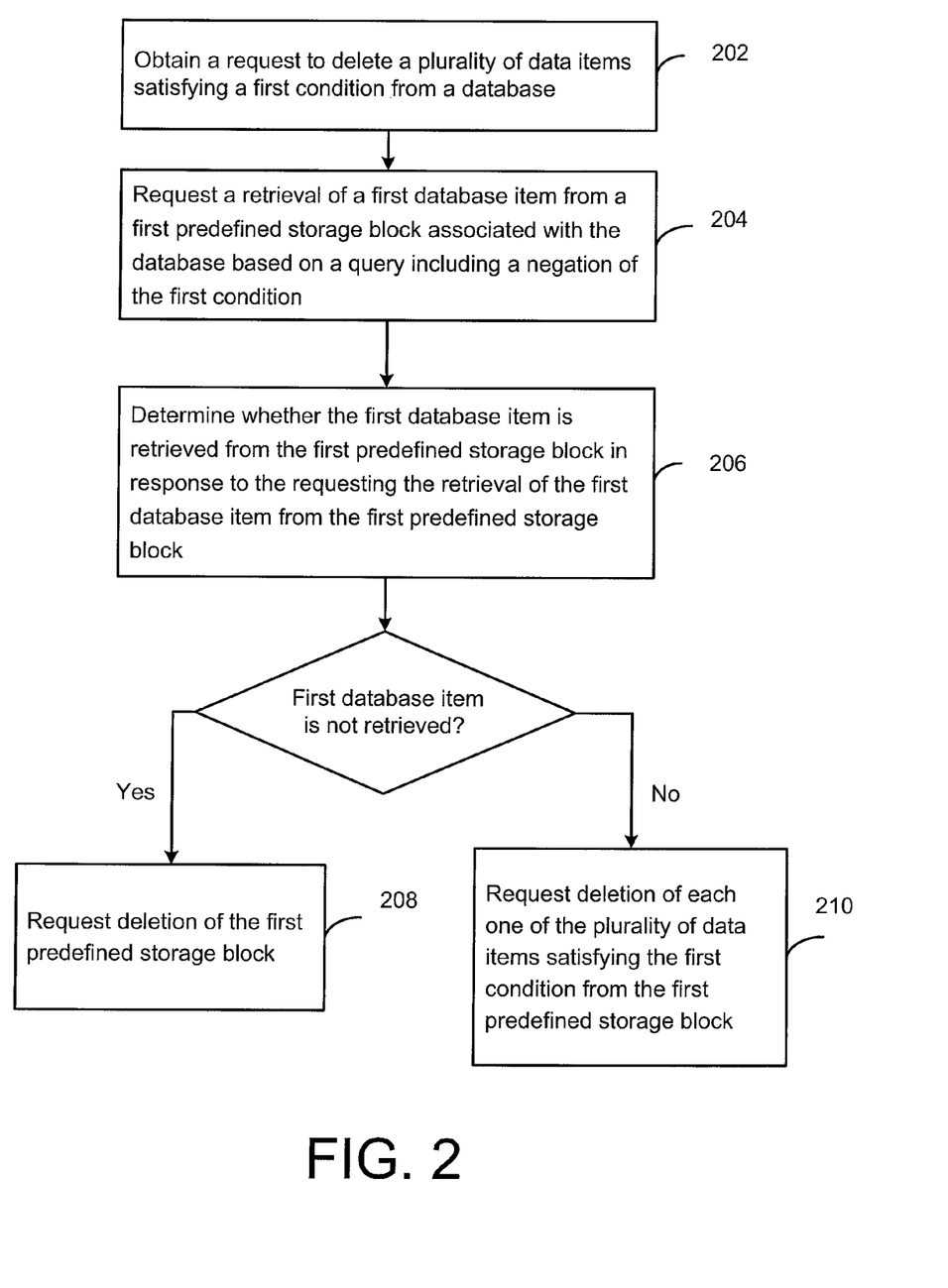
FIG. 2 is a flowchart illustrating an operation of the system of FIG. 1 according to an example embodiment.

FIG. 2 is a flowchart illustrating an operation of the system of FIG. 1. According to an example embodiment, a method may include obtaining a request to delete a plurality of data items satisfying a first condition from a database (202). For example, the deletion request receiver 112 may obtain the request to delete the data items satisfying a first condition from a database, as discussed previously.

According to an example embodiment, the method may further include requesting a retrieval of a first database item from a first predefined storage block associated with the database based on a query including a negation of the first condition (204). For example, the retrieval request processor 114 discussed previously may request a retrieval of a first database item from a first predefined storage block associated with the database based on a query including a negation of the first condition. For example, the first predefined storage block may include one of the storage blocks 110a, 110b, 110c discussed previously.

The method may further include determining whether the first database item is retrieved from the first predefined storage block in response to the requesting the retrieval of the first database item from the first predefined storage block (206). For example, the retrieval analyzer 116 discussed previously may determine whether the first database item is retrieved from the first predefined storage block in response to the requesting the retrieval of the first database item from the first predefined storage block. Thus, if the first database item is not retrieved, the first predefined storage block may be removed or deleted, as every data item in the first predefined storage block satisfies the first condition.

According to an example embodiment, determining whether the first database item is retrieved from the first predefined storage block may include determining whether only a single database item is retrieved from the first predefined storage block in response to the requesting the retrieval of the first database item from the first predefined storage block.

The method may further include requesting deletion of the first predefined storage block (208), when it is determined based on the determining that the first database item is not retrieved. According to an example embodiment, the block deletion processor 118 discussed previously may request deletion of the first predefined storage block, when it is determined based on the determining that the first database item is not retrieved. Thus, when every data item stored in the first predefined storage block satisfies the first condition, the first predefined storage block may be removed or deleted.

The method may further include requesting deletion of each one of the plurality of data items satisfying the first condition from the first predefined storage block (210), when it is determined based on the determining that the first database item is retrieved. According to an example embodiment, the data item deletion processor 120 discussed previously may request deletion of each one of the plurality of data items satisfying the first condition from the first predefined storage block, when it is determined based on the determining that the first database item is retrieved.

According to an example embodiment, requesting the deletion of the first predefined storage block may include requesting a truncation of a database table.

According to an example embodiment, requesting the deletion of the first predefined storage block may include requesting a truncation of a database table fragment.

According to an example embodiment, requesting the retrieval of the first database item may include requesting the retrieval of the first database item from a first partition associated with the database based on a query including a negation of the first condition, and requesting deletion of the first predefined storage block may include requesting deletion of the first partition.

According to an example embodiment, a retrieval of a second database item from a second predefined storage block associated with the database may be requested based on a query including a negation of the first condition. It may be determined whether the second database item is retrieved from the second predefined storage block in response to the requesting the retrieval of the second database item from the second predefined storage block. According to an example embodiment, deletion of the second predefined storage block may be requested, when it is determined based on the determining that the second database item is not retrieved, and deletion of each one of the plurality of data items satisfying the first condition from the second predefined storage block may be requested, when it is determined based on the determining that the second database item is retrieved.

According to an example embodiment, requesting the retrieval of the first database item may include requesting the retrieval of the first database item from an indexed partition associated with the database based on a query including a negation of the first condition.

Since a database may grow over time, administrators may desire removal of old or unused data. However, deleting large amounts of data may require long-running and very resource-intensive operations on relational databases. Therefore, database vendors may provide methods for fast deletion of mass data if a whole table, table partition (e.g., Oracle, MSSQL, IBM DB2 UDB), table fragment (e.g., IBM Informix), or table block (e.g., IBM DB2 UDB) may be deleted. As used herein, the terms "table partitioning" or "data blocks" may refer to these example techniques.

Using table partitioning, database tables may be split into distinct sets of data records by fixed values or ranges of values. Each table partition may then be treated as an object that can easily be created, dropped, or truncated (e.g., by dropping and recreating the object) including referencing indexes.

A database index is a data structure that may improve the speed of operations in a table. Example indexes may be generated using one or more columns, providing a basis for both rapid random lookups and efficient ordering of access to records. The disk space required to store an index may be significantly less than the storage needed for the table, many example indexes may contain only the key-fields according to which the table is to be arranged, and may exclude all the other details in the table. For relational databases an index may include a copy of part of a table. Example indexes may be implemented using a variety of data structures, such as balanced trees, B– trees, B+ trees and hashes.

One example database data partitioning (DPF) feature may divide a database into database partitions. Each database partition may have its own set of computing resources, including CPU and storage. In a DPF environment, each table row may be distributed to a database partition according to a distribution key specified in a CREATE TABLE statement. When a query is processed, the request is divided so each database partition processes the rows for which it is responsible. DPF may maintain consistent query performance as the table grows by providing a capability to add more processing power in the form of additional database partitions.

Another example database table partitioning (TP) feature may provide that rows with similar values may be stored together. TP may support partitioning a table into data partitions along a single dimension. Thus, a data partition may be generated for each month's data. Using TP, a user may manually define each data partition, including the range of values to include in that data partition. Further, each TP partition may include a separate database object, unlike other example tables which may be a single database object. Consequently, TP may provide attachment and detachment of a data partition from the TP table. A detached partition may become a regular table, and each data partition may be placed in its own table space, if desired.

An example database operation 'DELETE FROM' table deletes each row as a separately logged operation. If indexes exist on the table, each index may be updated when a row is deleted, and this update is also logged for each row.

An example database operation 'TRUNCATE' table may perform the removal of all rows and of the B-tree structures of every index on the table as a single operation, and may write a single entry in a logical log when a transaction that includes 'TRUNCATE' is committed or rolled back.

Truncating a table may be similar to using a delete statement with no 'where' clause as both operations remove all rows in the table; however, truncating a table may execute faster and may use fewer system and transaction log resources than a delete statement. For example, truncating a table removes all rows from the table, but the table structure and its columns, constraints, indexes etc., remains as it is. An example drop table statement may remove a table definition and its data.

Before a table or table partition may be dropped or truncated to accelerate mass data deletion, an application may need to ensure that a delete condition is satisfied by all data records within a table or table partition. A fast technique for determining whether a drop or truncate table or table partition can be performed is desirable.

One example technique for checking a table or table partition before deletion may include counting the records with and without the delete condition. If the numbers of records with and without the delete condition are the same for a table or table partition, it may be truncated before deletion. Otherwise, single record deletion must be performed for all records. The following example discussed with regard to FIGS. 3-7 is based on counting records for a table partitioned by calendar month, and is presented in terms of Structured Query Language instructions, although one skilled in the art of data processing may understand that any other type of database data processing instructions may also be used.

Figure 3:
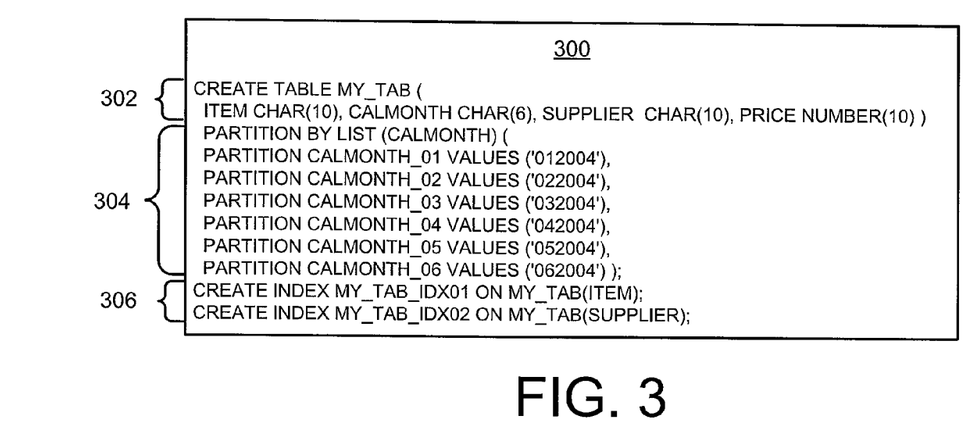
FIG. 3 depicts example database instructions for generating data blocks according to an example embodiment.

FIG. 3 depicts example database instructions 300 for generating data blocks according to an example embodiment. For example, a set 302 of instructions is configured to generate a database table named MY_TAB including fields or columns ITEM, CALMONTH, SUPPLIER, and PRICE. A set 304 of instructions is configured to generate the table MY_TAB as a partitioned database table, or as a database table stored in data blocks that are organized according to the field or column CALMONTH. As shown in FIG. 3, the data blocks are partitioned by month for the first six months of 2004. A set 306 of instructions are configured to organize the storage of the table based on an indexed structure based on the fields or columns ITEM and SUPPLIER. Thus, searching for items stored in the tables may be more efficiently performed based on traversing the index structures from a root node down to leaf nodes where table items may be stored, instead of performing a liner search of a whole database table.

Figure 4:
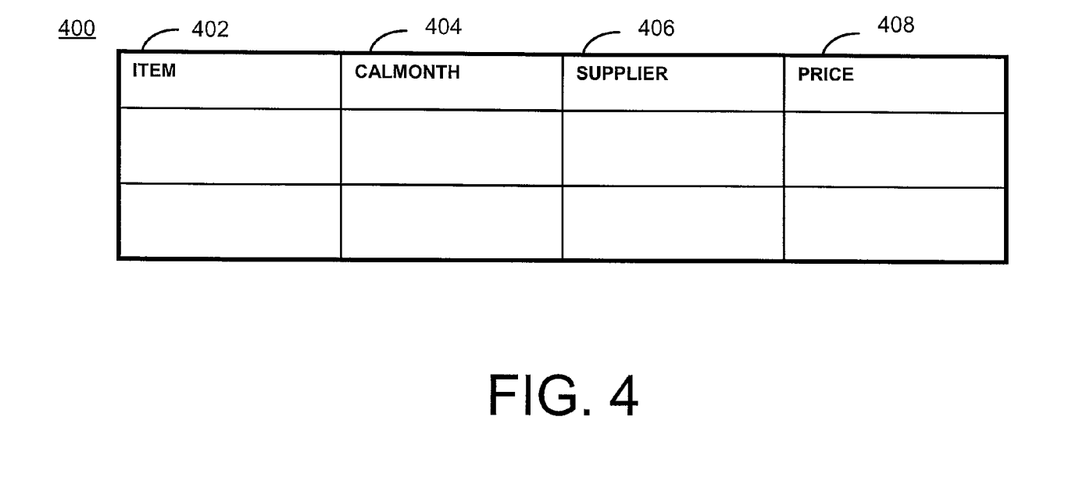
FIG. 4 depicts an example database table based on the instructions of FIG. 3.

FIG. 4 depicts an example database table 400 based on the instructions of FIG. 3. As shown on FIG. 4, the database table MY_TAB includes columns named ITEM 402, CALMONTH 404, SUPPLIER 406, and PRICE 408, as defined by the set of instructions 302 discussed previously with regard to FIG. 3.

Figure 5:
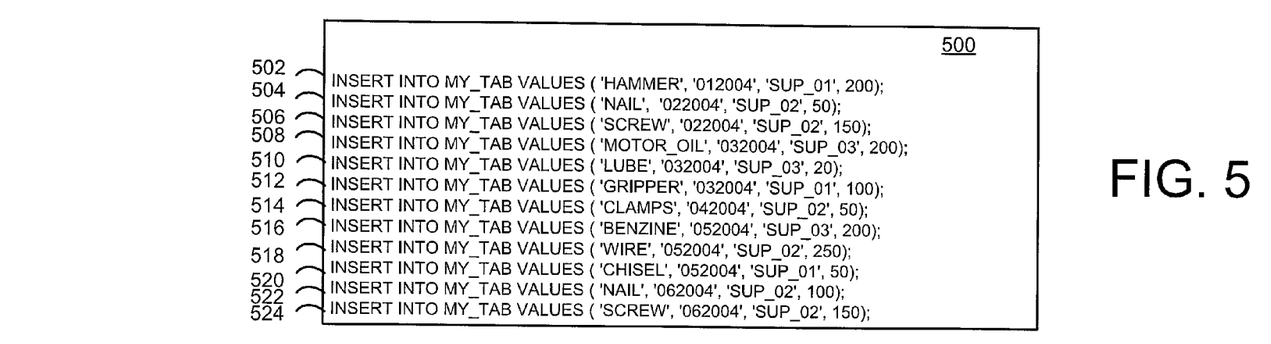
FIG. 5 depicts example database instructions for inserting example database information into database tables according to an example embodiment.

FIG. 5 depicts example database instructions 500 for inserting example database information into database tables according to an example embodiment. For example, INSERT instructions 502-524 as shown in FIG. 5 are configured to insert values for individual records to be stored in the table MY_TAB.

Figure 6:
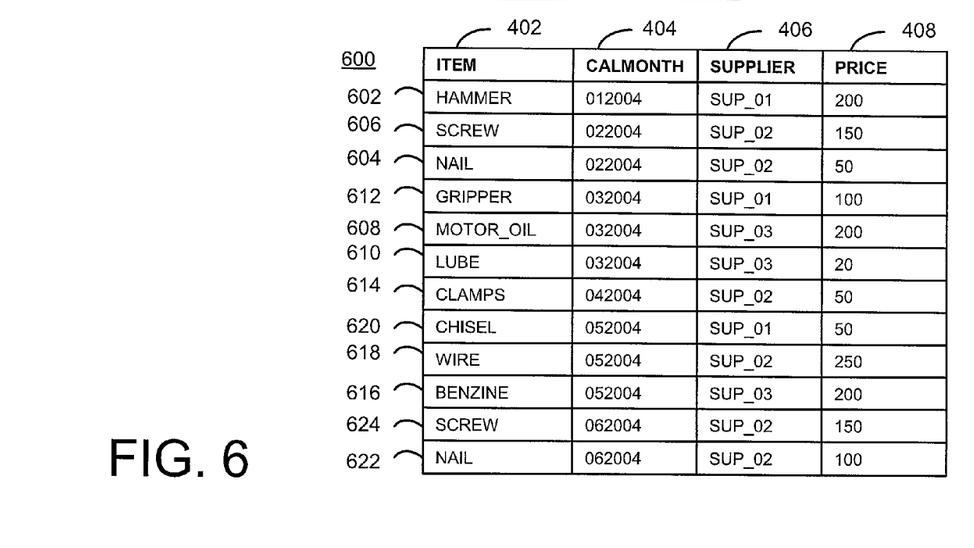
FIG. 6 depicts an example database table including example database information based on the instructions of FIG. 5.

FIG. 6 depicts an example database table 600 including example database information based on the instructions of FIG. 5. As shown in FIG. 6, the values of records 602-622 are inserted into the table MY_TAB based on corresponding INSERT instructions as shown in FIG. 5 discussed previously. Thus, for example, information associated with a hammer as shown by the INSERT instruction 502 is inserted into the table 600 as record 602. Similarly, information associated with a screw as shown by the INSERT instruction 506 is inserted into the table 600 as record 606.

Figure 7:
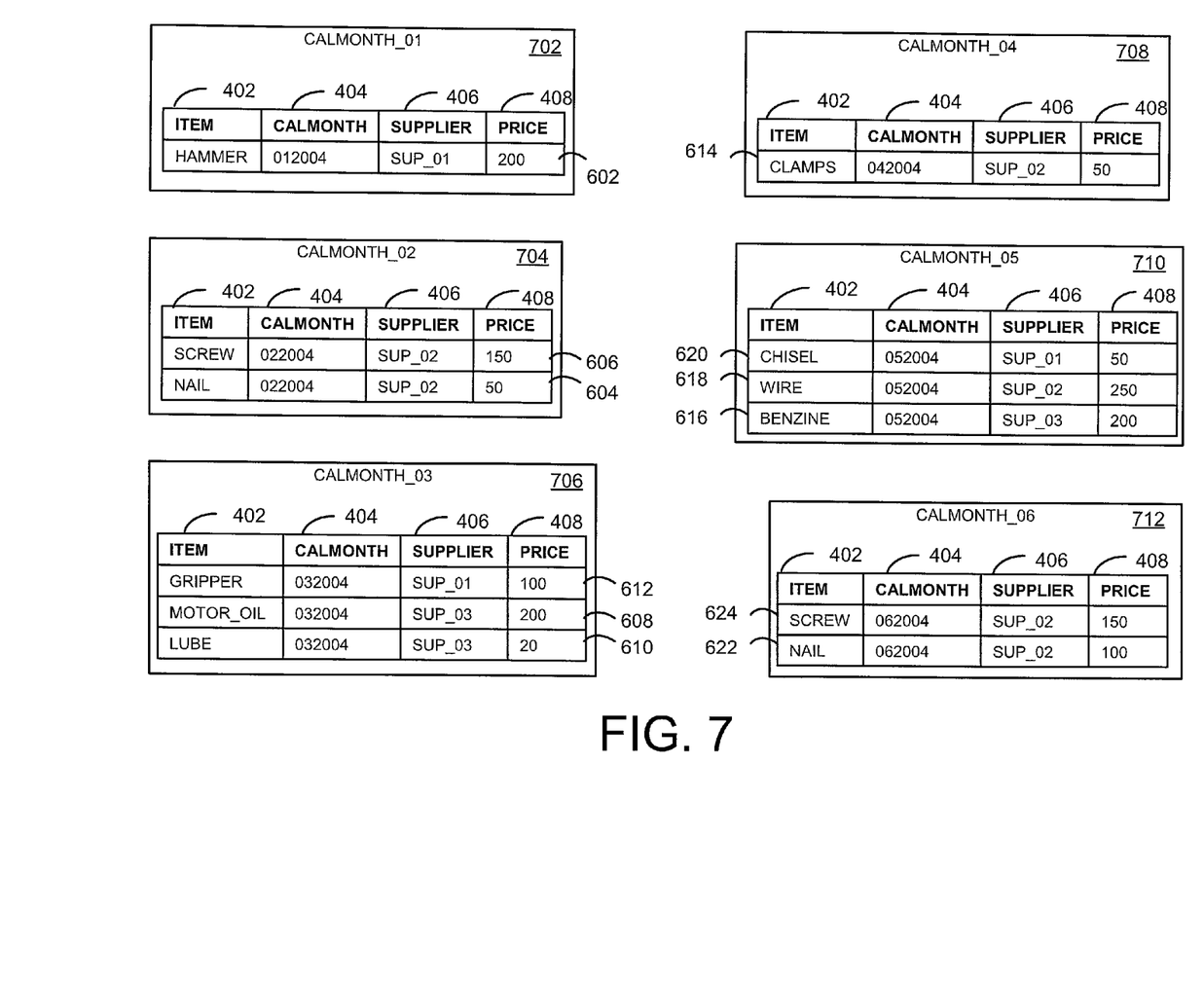
FIG. 7 depicts an example data blocks including example database information based on the instructions of FIG. 3 and FIG. 5.

FIG. 7 depicts an example data blocks 702, 704, 706, 708, 710, 712 including example database information based on the instructions of FIG. 3 and FIG. 5. Thus, as shown in FIG. 7, the data block 702 includes information associated with the hammer record 602, since the hammer record 602 includes a value of "012004" for CALMONTH 404, which is included in a partition named CALMONTH_01 in accordance with the partition instructions included in the set of instructions 304 of FIG. 3. Similarly, for example, the data block 704 includes information associated with records for screw 606 and nail 604, since each of the records for screw 606 and nail 604 includes a value of "022004" for CALMONTH 404, which is included in a partition named CALMONTH_02 in accordance with the partition instructions included in the set of instructions 304 of FIG. 3.

In accordance with an example scenario, it may be determined that Supplier SUP_02 has gone into liquidation. Thus, it may be desired by a user to delete all records having a value SUPPLIER='SUP_02', which may be accomplished with an example data manipulation language (DML) statement such as:

DELETE FROM MY_TAB WHERE
    SUPPLIER='*SUP_02*'     (1)

However, in order to accelerate deletion, partitions that include only records that include a value of SUPPLIER='SUP_02' may be truncated before executing an actual database 'delete' statement. In one example technique based on Structured Query Language (SQL) instructions, records may be counted twice per partition, once with and once without, the delete condition, for example:

```
SELECT COUNT(*) AS CNT_ALL FROM MY_TAB                    (2)
    WHERE CALMONTH = '012004';
and
SELECT COUNT(*) AS CNT_DEL FROM MY_TAB                    (3)
    WHERE CALMONTH = '012004' AND SUPPLIER = 'SUP_02';
```

Each of the SELECT instructions (2) and (3) include an example constraint CALMONTH to limit analysis to the table partition CALMONTH_01 702 only. Partition or data block CALMONTH_01 702 that includes data for January 2004 may be truncated if the numbers of records that are counted with and without the delete condition are the same. The check as shown above may need to be performed for each table partition 702-712 separately.

During execution of SQL statement (2), a database program may perform either a full table scan as discussed below with regard to FIG. 8, or an index range scan as discussed below with regard to FIG. 9, to count all records. In both cases, the number of database pages to be read may scale linearly with the number of records in the database table. During execution of example SQL statement (3), the database program may perform an index range scan as discussed below with regard to FIG. 10, to count records that match the delete condition. Again, the number of database pages to be read may scale linearly with the number of records in the database table, if equal data deviation is assumed for the column 'Supplier' 406.

As a consequence, SQL statements (2) and (3) may not provide a fast check for big tables or table partitions, as it may require multiple passes to determine that there is neither a partition nor table that may be dropped or truncated before executing the actual delete statement.

Figure 8:
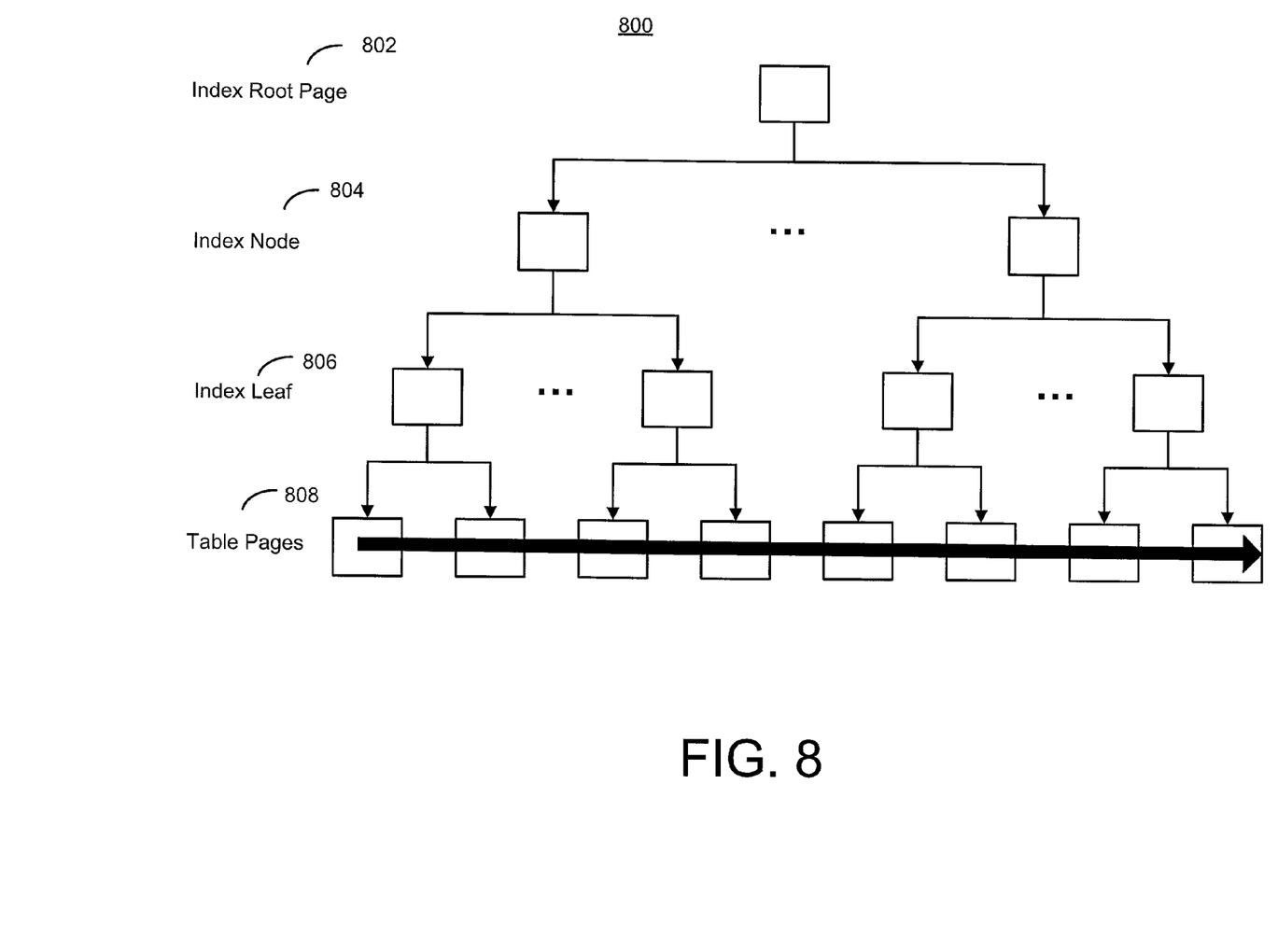
FIG. 8 illustrates an operation of an example database query based on a full table scan of database table pages.

FIG. 8 illustrates an operation of an example database query based on a full table scan of database table pages. As shown in FIG. 8, an index 800 may be traversed in processing a database query. For example, the index may include a B-tree index. The traversal may originate at an index root page 802 at a root level of the index structure 800, followed by visiting one or more index nodes at a next level down the index structure 800. The traversal may then visit one or more index leafs 804, at a next level down the index structure 800. As shown in FIG. 8, the full table scan visits all table pages 806 at a next level down in the index structure 800. Thus, a full table scan may be performed on a database table or table partition, such that all data pages may be read to count the number of records in a database table or table partition. This access technique may be used, for example, if a table or table partition contains only a few data records or if the table has no index.

Figure 9:
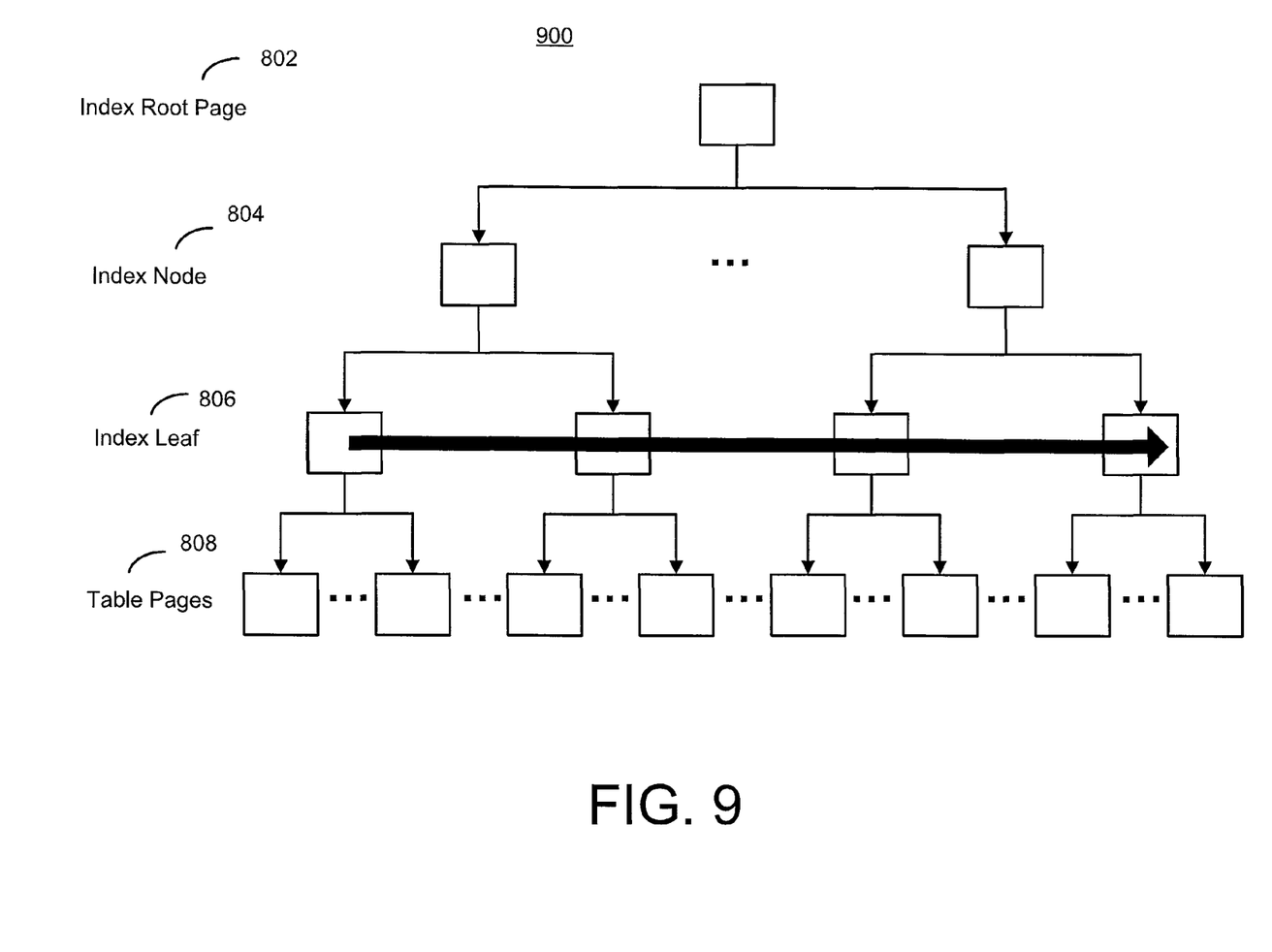
FIG. 9 illustrates an operation of an example database query based on a full index range scan of database index leaf nodes based on a B-tree index.

FIG. 9 illustrates an operation of an example database query based on a full index range scan of database index leaf nodes based on a B-tree index. As shown in FIG. 9, an index 900 may be traversed in processing a database query. A traversal of the index 900 may be initiated similarly to the traversal of the index 800 discussed above, except that the traversal may terminate after visiting all index leaf pages on the level above the table pages in the index 900. Thus, as shown in FIG. 9, a full index range scan may be performed on a database table or table partition with a B-tree index, such that all index leaf pages may be read to count the number of records in the table or table partition. This access technique may be used, for example, if an index exists and a table or table partition contains many data records.

Figure 10:
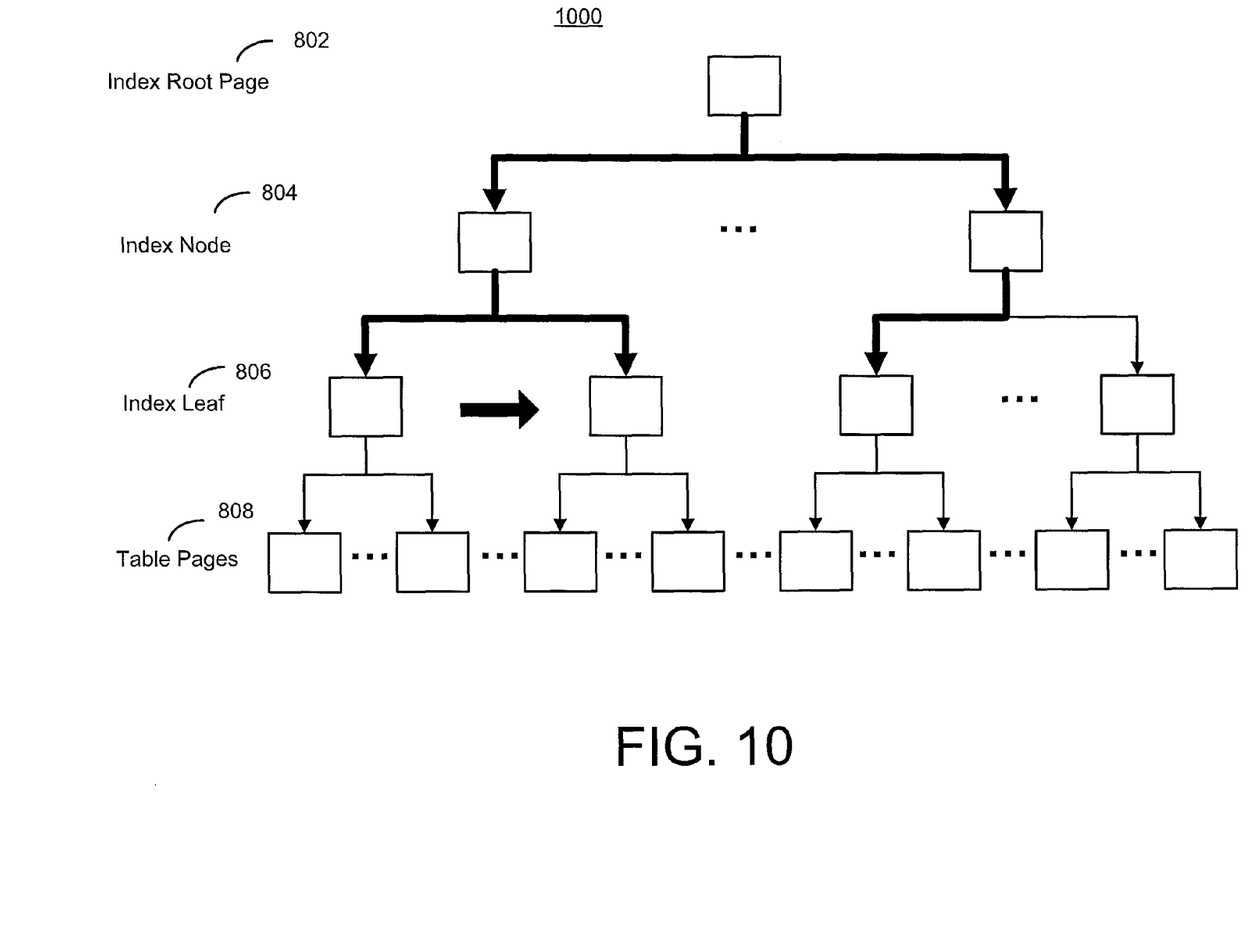
FIG. 10 illustrates an operation of an example database query based on an index range scan of database index leaf nodes based on a B-tree index.

FIG. 10 illustrates an operation of an example database query based on an index range scan of database index leaf nodes based on a B-tree index. As shown in FIG. 10, an index 1000 may be traversed in processing a database query. A traversal of the index 1000 may be initiated similarly to the traversal of the index 800 discussed above. As shown in FIG. 10, however, an index range scan on a database table or table partition with a B-tree index, may include reading a predefined subset of index leaf pages to count a limited number of records in the table or table partition. This access technique may be used, for example, if an index exists, a table or table partition contains many data records, and the SQL statement contains a WHERE condition on an indexed table field.

According to an example embodiment, instead of counting a large number of records, a check may be performed that is independent of table size, as discussed below, and as based on the following:

If $T = \{t_1, t_2, \ldots t_n\}$ is a set of elements and $T^c = \{t_1^c, t_2^c \ldots t_m^c\}$ is a subset of elements of T, then T is equal to $T^c$ if all elements of T are also elements of $T^c$:

$$T = T^c \Leftrightarrow \forall t_i \in T : t_i \in T^c \quad (4)$$

An example negation of expression (4) may be expressed as:

$$T \neq T^c \Leftrightarrow \exists t_i \in T : t_i \notin T^c \quad (5)$$

Expression (4) is true if expression (5) is false and vice versa. Translating (4) and (5):

A table or table partition cannot be empty after deletion, if a single record may be identified that satisfies an inverse (e.g., negated) delete condition.

Thus, the checks (2) and (3) may be replaced by the following SQL statement:

```
SELECT CALMONTH FROM MY_TAB                              (6)
    WHERE SUPPLIER != 'SUP_02' AND CALMONTH = '012004'
        AND ROWNUM = 1
```

ROWNUM may be used (e.g., by Oracle) to limit a number of records fetched by a SQL statement. For the present example, only one record needs to be fetched to satisfy expression (5). By using example techniques based on (6) a data record from Table MY_TAB may be accessed directly, for example, via the nodes of B-tree index MY_TAB_IDX02. This example access path may be almost independent of table size, as the number of database pages to be read may scale with $\log_m (n)$, where m may indicate an average number of entries of an index page and n may indicate a number of records in a table or table partition, as discussed further below with regard to FIG. 11.

If no record is returned by statement (6), the partition CALMONTH_01 may be dropped or truncated before deletion. The following example SQL statement may return all months of table MY_TAB that cannot be eliminated via drop or truncate before executing the example delete statement (1):

```
SELECT 'CALMONTH' FROM MY_TAB                            (7)
    WHERE SUPPLIER != 'SUP_02' AND CALMONTH = '012004'
        AND ROWNUM = 1
    UNION ALL
    SELECT CALMONTH FROM MY_TAB
      WHERE SUPPLIER != 'SUP_02' AND CALMONTH = '022004'
        AND ROWNUM = 1
    UNION ALL
    ...
```

-continued

```
UNION ALL
SELECT CALMONTH FROM MY_TAB
    WHERE SUPPLIER != 'SUP_02' AND CALMONTH =
        '062004' AND ROWNUM = 1;
```

An example Algorithm I shown below describes an example technique that may be performed for fast checking of tables or table partitions before deletion:

ALGORITHM I

1. Define a delete statement (e.g., determine the condition for deletion)
2. Invert delete condition (e.g., determine the negation of the condition)
3. Select one record from tables or table partitions using the inverted delete condition
4. Drop or truncate tables or partitions that do not return a data record in response to a request for records based on the inverted delete condition
5. Execute delete statement(s) to eliminate the residual data records not eliminated by drop or truncate According to an example embodiment, the third step of Algorithm I may be applied for each partition, if table partitioning is used.

Figure 11:
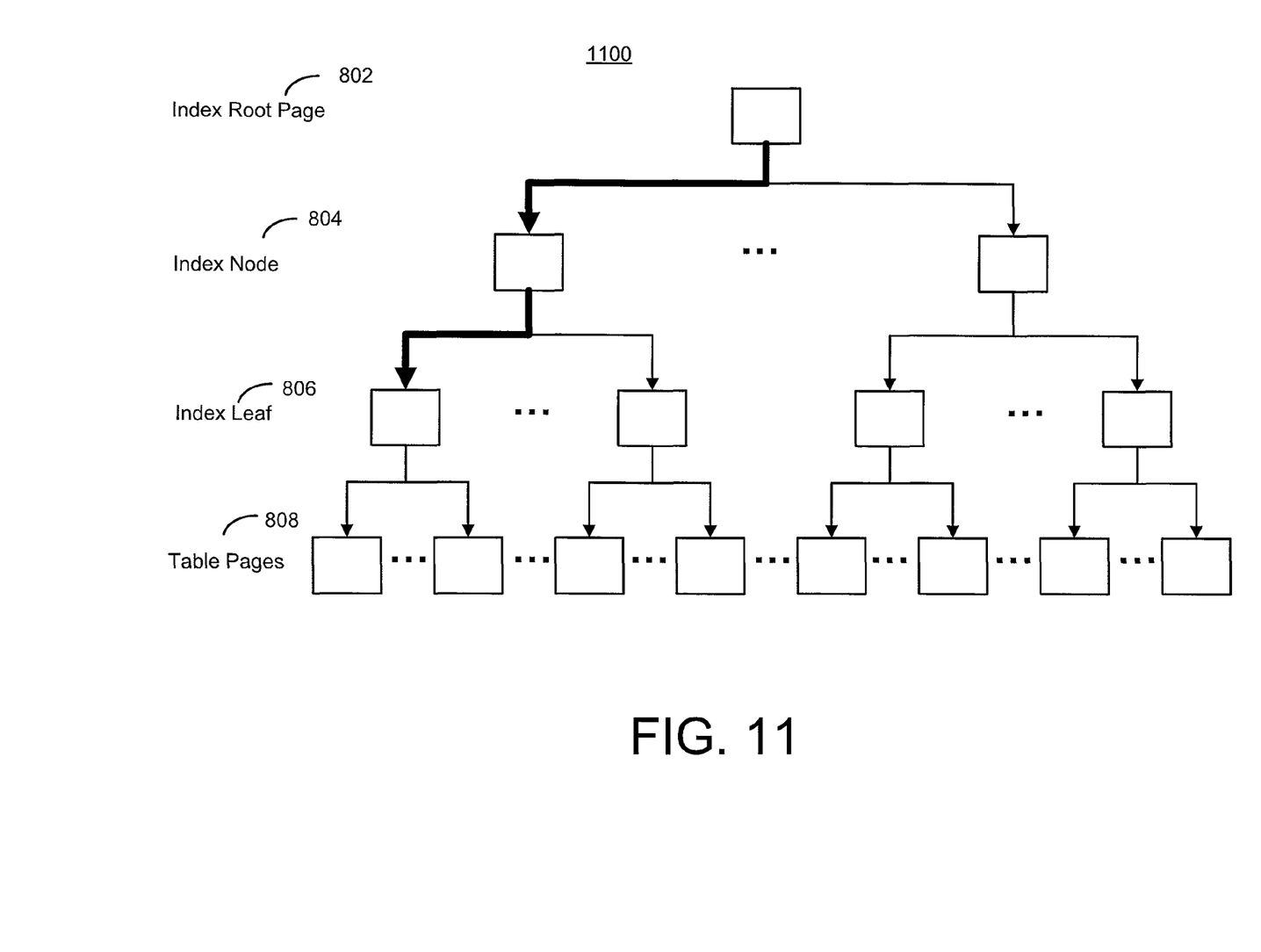
FIG. 11 illustrates an operation of an example database query based on accessing a single database record via index nodes of the database based on a B-tree index according to an example embodiment.

FIG. 11 illustrates an operation of an example database query based on accessing a single database record via index nodes of the database based on a B-tree index according to an example embodiment. As shown in FIG. 11, an index 1100 may be traversed in processing a database query based on a negation of the condition for deletion of records. A traversal of the index 1100 may be initiated similarly to the traversal of the index 800 discussed above. However, according to an example embodiment, a single record may be accessed via index nodes, and thus this example access technique may be used if an index exists, a table or table partition contains a large number of data records, and a value or range for an indexed column is specified in a WHERE clause. If a single record is accessed, then a deletion of each record satisfying the condition may be performed. If no record is accessed, then a partition or data block may be removed or deleted instead of deleting each individual record, which may save substantial processing resources.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:
    at least one programmable processor configured to execute a computer program;
    at least one memory device comprising the computer program tangibly embodied therein; and
    a database storage area including:
        a plurality of predefined storage blocks configured to store database items associated with a database;
    wherein when the programmable processor executes the computer program, the system comprises a data deletion manager including:

a deletion request receiver configured to obtain a request to delete a plurality of data items satisfying a first condition from the database, a retrieval request processor configured to request a retrieval of a first database item from a first predefined storage block associated with the database based on the first database item not satisfying the first condition, a retrieval analyzer configured to determine whether the first database item is retrieved from the first predefined storage block in response to the retrieval request processor requesting the retrieval of the first database item from the first predefined storage block, the first database item comprising only a single database item, a block deletion processor configured to request deletion of the first predefined storage block based on the retrieval analyzer determining that the first database item is not retrieved from the first predefined storage block, and a data item deletion processor configured to request deletion of each one of the plurality of data items satisfying the first condition from the first predefined storage block based on the retrieval analyzer determining that the first database item is retrieved from the first predefined storage block.

2. The system of claim 1 wherein:

the plurality of predefined storage blocks includes a plurality of predefined database partitions configured to store database items associated with the database, the retrieval request processor is configured to request the retrieval of the first database item from a first predefined database partition associated with the database based on the first database item not satisfying the first condition, the retrieval analyzer is configured to determine whether the first database item is retrieved from the first predefined database partition in response to the retrieval request processor requesting the retrieval of the first database item from the first predefined database partition, and the block deletion processor is configured to request deletion of the first predefined database partition based on the retrieval analyzer determining that the first database item is not retrieved.

3. The system of claim 1 wherein:

the retrieval request processor is configured to request a retrieval of a second database item from a second predefined storage block associated with the database based on the second database item not satisfying the first condition;

the retrieval analyzer is configured to determine whether the second database item is retrieved from the second predefined storage block in response to the retrieval request processor requesting the retrieval of the second database item from the second predefined storage block;

the block deletion processor is configured to request deletion of the second predefined storage block based on the retrieval analyzer determining that the second database item is not retrieved; and the data item deletion processor is configured to request deletion of each one of the plurality of data items satisfying the first condition from the second predefined storage block based on the retrieval analyzer determining that the second database item is retrieved.

4. The system of claim 1 wherein:

the retrieval request processor is configured to request the retrieval of the first database item from an indexed partition associated with the database based on the first database item not satisfying the first condition.

5. The system of claim 1 wherein:

the block deletion processor is configured to request deletion of the first predefined storage block based on requesting a truncation of a database table.

6. The system of claim 1 wherein:

the block deletion processor is configured to request deletion of the first predefined storage block based on requesting a truncation of a database table fragment.

7. The system of claim 1 wherein the database includes a relational database.

8. A method comprising:

obtaining a request to delete a plurality of data items satisfying a first condition from a database;

requesting a retrieval of a first database item from a first predefined storage block associated with the database based on the first database item not satisfying the first condition;

determining whether the first database item is retrieved from the first predefined storage block in response to the requesting the retrieval of the first database item from the first predefined storage block, the first database item including only a single database item;

when it is determined based on the determining that the first database item is not retrieved from the first predefined storage block, requesting deletion of the first predefined storage block; and when it is determined based on the determining that the first database item is retrieved from the first predefined storage block, requesting deletion of each one of the plurality of data items satisfying the first condition from the first predefined storage block.

9. The method of claim 8 wherein:

requesting the retrieval of the first database item comprises requesting the retrieval of the first database item from a first partition associated with the database based on the first database item not satisfying the first condition, and requesting deletion of the first predefined storage block comprises requesting deletion of the first partition.

10. The method of claim 8 and further comprising:

requesting a retrieval of a second database item from a second predefined storage block associated with the database based on the second database item not satisfying the first condition;

determining whether the second database item is retrieved from the second predefined storage block in response to the requesting the retrieval of the second database item from the second predefined storage block;

when it is determined based on the determining that the second database item is not retrieved, requesting deletion of the second predefined storage block; and when it is determined based on the determining that the second database item is retrieved, requesting deletion of each one of the plurality of data items satisfying the first condition from the second predefined storage block.

11. The method of claim 8 wherein:

requesting the retrieval of the first database item comprises requesting the retrieval of the first database item from an indexed partition associated with the database based on the first database item not satisfying the first condition.

12. The method of claim 8 wherein:

requesting deletion of the first predefined storage block comprises requesting a truncation of a database table.

13. The method of claim 8 wherein:
requesting deletion of the first predefined storage block comprises requesting a truncation of a database table fragment.

14. A computer-readable storage medium comprising a computer executable program tangibly embodied thereon, the computer executable program being configured to cause a data processing apparatus to:
obtain a request to delete a plurality of data items satisfying a first condition from a database;
request a retrieval of a first database item from a first predefined storage block associated with the database based on the first database item not satisfying the first condition;
determine whether the first database item is retrieved from the first predefined storage block in response to the requesting the retrieval of the first database item from the first predefined storage block, the first database item including only a single database item;
when it is determined based on the determining that the first database item is not retrieved from the first predefined storage block, request deletion of the first predefined storage block; and
when it is determined based on the determining that the first database item is retrieved from the first predefined storage block, request deletion of each one of the plurality of data items satisfying the first condition from the first predefined storage block.

15. The computer-readable storage medium of claim 14, wherein the program is further configured to cause the data processing apparatus to:
request the retrieval of the first database item based on requesting the retrieval of the first database item from a first partition associated with the database based on the first database item not satisfying the first condition, and
request deletion of the first predefined storage block based on requesting deletion of the first partition.

16. The computer-readable storage medium of claim 14, wherein the program is further configured to cause the data processing apparatus to:
request a retrieval of a second database item from a second predefined storage block associated with the database based on the second database item not satisfying the first condition;
determine whether the second database item is retrieved from the second predefined storage block in response to the requesting the retrieval of the second database item from the second predefined storage block;
request deletion of the second predefined storage block, when it is determined based on the determining that the second database item is not retrieved from the second predefined storage block; and
request deletion of each one of the plurality of data items satisfying the first condition from the second predefined storage block, when it is determined based on the determining that the second database item is retrieved from the second predefined storage block.

17. The computer-readable storage medium of claim 14, wherein the program is further configured to cause the data processing apparatus to:
request the retrieval of the first database item based on requesting the retrieval of the first database item from an indexed partition associated with the database based on the first database item not satisfying the first condition.

\* \* \* \* \*